(12) United States Patent
Khawand

(10) Patent No.: US 7,212,809 B2
(45) Date of Patent: May 1, 2007

(54) METHOD AND APPARATUS FOR SERVICE NEGOTIATION ACCELERATION

(75) Inventor: Charbel Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 360 days.

(21) Appl. No.: 10/359,862

(22) Filed: Feb. 6, 2003

(65) Prior Publication Data

US 2004/0157602 A1    Aug. 12, 2004

(51) Int. Cl.
H04M 3/42    (2006.01)
(52) U.S. Cl. .................... 455/414.1; 455/414.2
(58) Field of Classification Search ............. 455/414.1, 455/411, 414.2, 414.3, 435.2, 430, 432.2, 455/436.3, 435.1
See application file for complete search history.

(56) References Cited

U.S. PATENT DOCUMENTS 6,597,675 B1 *   7/2003  Esmailzadeh et al. ...... 370/335
6,788,940 B2 *   9/2004  Bhatoolaul et al. ......... 455/442
6,859,445 B1 *   2/2005  Moon et al. ................ 370/335
2003/0053434 A1 *  3/2003  Chow et al. ................ 370/338
2003/0100307 A1 *  5/2003  Wolochow et al. ......... 455/440

* cited by examiner

Primary Examiner—Temica Beamer
Assistant Examiner—Joy Contee

(57) ABSTRACT

An initial channel access message such as a Random Access Channel (RACH) preamble is used to mean that not only that a channel access has been requested by a mobile station (500) but also that a particular type of service has been requested. By associating a type of service (e.g., Dispatch, web browsing, etc.) with the particular signature that is used to form the RACH preamble it speeds up the service negotiation process. Both the communication system (600) and the MS (500) know what service is associated with which signature, so as soon as a RACH preamble is received by the system, it can determine if it has the resources available to accommodate the request.

19 Claims, 4 Drawing Sheets

| SIGNATURE # | SERVICE/APPLICATION |
|---|---|
| SIGNATURE 1 | DISPATCH |
| ⋮ | |
| SIGNATURE 16 | WEB BROWSING |

METHOD AND APPARATUS FOR SERVICE NEGOTIATION ACCELERATION

TECHNICAL FIELD

This invention relates in general to the field of wireless communications and more specifically to a method and apparatus for accelerating service negotiation in a wireless communication system.

BACKGROUND

In a wireless communication system such as a Wideband Code Division Multiple Access (WCDMA) system, Mobile Stations (MSs) operating in the system negotiate a certain Quality of Service (QoS) with the system before they are granted a dedicated data channel. The negotiation process may differ from one particular system to another, however, common to all communication systems is the fact that most service request negotiations include a repetition of information such as data rates, spreading factors, mean packet delay requirements, packet loss, etc.

An MS commencing a negotiation for service does not guarantee a service request will be granted, which is certainly true in congested geographic areas. In addition, the time it takes a MS to realize success or failure in a service negotiation is usually long enough to cause wasted battery life for the MS and an overall increase in system noise due to the number of service requests that ultimately will not be successful that are transmitted.

A typical prior art service request negotiation in a Universal Mobile Telephone Service (UMTS) WCDMA system is shown in FIG. 1. In a UMTS system, when a MS requests a particular service, it will begin the service negotiation by sending an access attempt in the form of a Random Access Channel (RACH) preamble 102 to the system. Each access preamble 102 in the example shown in FIG. 1 is made up of a signature repeated 256 times to form a 4096 bit wide preamble frame 104. The signature is selected randomly for each access preamble from a group of signatures stored in the MS. The MS receives the set of available signatures during system initialization or registration of the MS into the system from the communication system. The preamble corresponds to a signature S that includes 256 repetitions of a length 16-signature (Sx, 15 to Sx, 0). In the UMTS system, the signature is from a set of 16 Hadamard codes of length 16. There exist a total of 16 signatures to randomly choose from for the RACH preamble transmission 102 for each RACH channel, and there are a maximum of 16 RACH channels, corresponding to the maximum available preamble scrambling codes. What distinguish the preamble transmission of two different mobile stations on the uplink path is the unique scrambling codes assigned for each user by the base station (cell site).

Depending on the MS's access class, it can use certain time slots ("access slots") 106 for its preamble transmissions. If the system properly receives the access request, it will acknowledge it by resending the same signature as a downlink acquisition indicator (AI) 108 on the Acquisition Indicator Channel (AICH) by the base station. The MS decodes the system acknowledgment, and proceeds to send its RACH message 110 to the system.

In FIG. 2 there is shown a prior art service negotiation between the communication system and an MS. In Step 202, the MS sends an uplink RACH 202 followed by a response by the system in the downlink path. This RACH process takes approximately 300 milliseconds (ms) to complete as shown. A Radio Resource Control (RRC) signaling 204 follows the RACH signaling 202. If the system successfully decodes the RACH message, it will inform the MS of the establishment of the signaling link. At this point, the MS initiates its service request 206, followed by authentication 208 and identity check 210 signaling sequences. The overall service negotiation process takes approximately 5 to 8 seconds to complete. At the end of the negotiation, the MS realizes whether or not the system is willing to grant it a channel for the service requested.

As more and more services that require faster access times to system resources (e.g., real time services like dispatch calls, etc.) are introduced, a need exists for a way of accelerating the service negotiation process in order to provide faster system access times and help improve some of the problems previously noted.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 7 shows a table that associates different services/applications with specific signatures in accordance with the invention.

DETAILED DESCRIPTION OF THE PREFERRED EMBODIMENT

Figure 1:
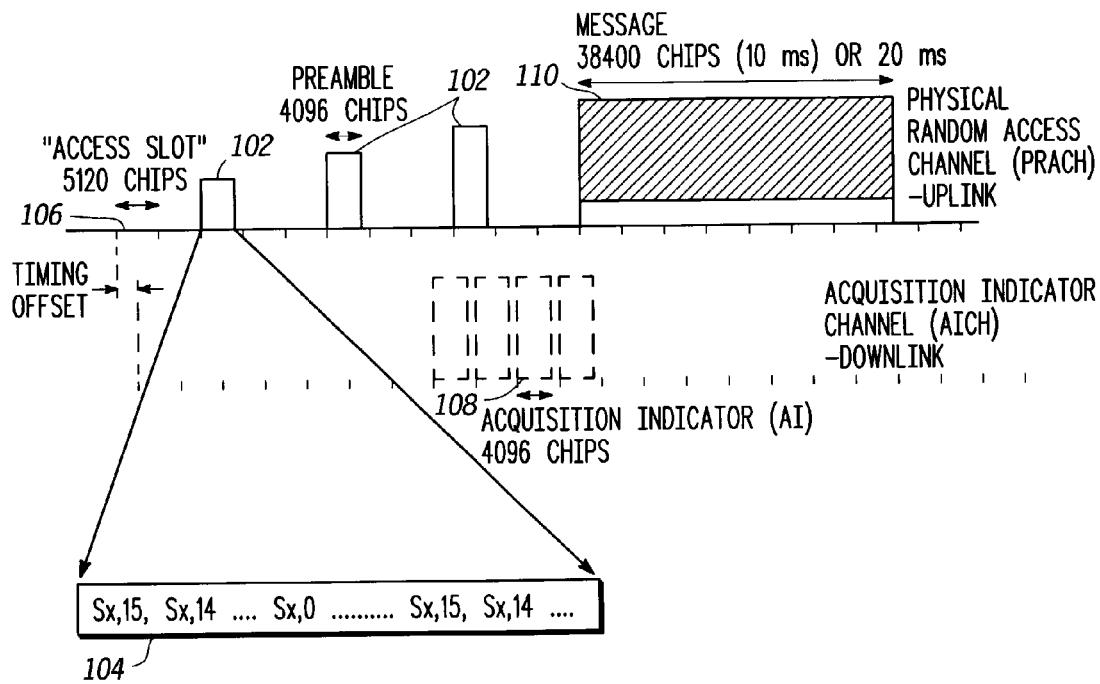
FIG. 1 shows a prior art RACH access procedure in a UMTS system.

While the specification concludes with claims defining the features of the invention that are regarded as novel, it is believed that the invention will be better understood from a consideration of the following description in conjunction with the drawing figures.

Figure 2:
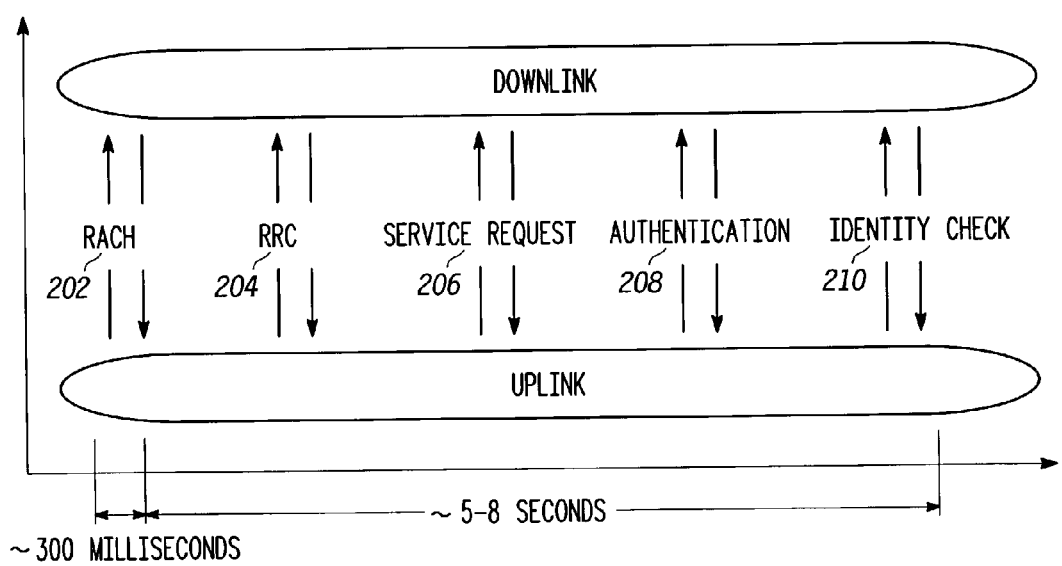
FIG. 2 shows a prior art service negotiation procedure in a UMTS system.
Figure 3:
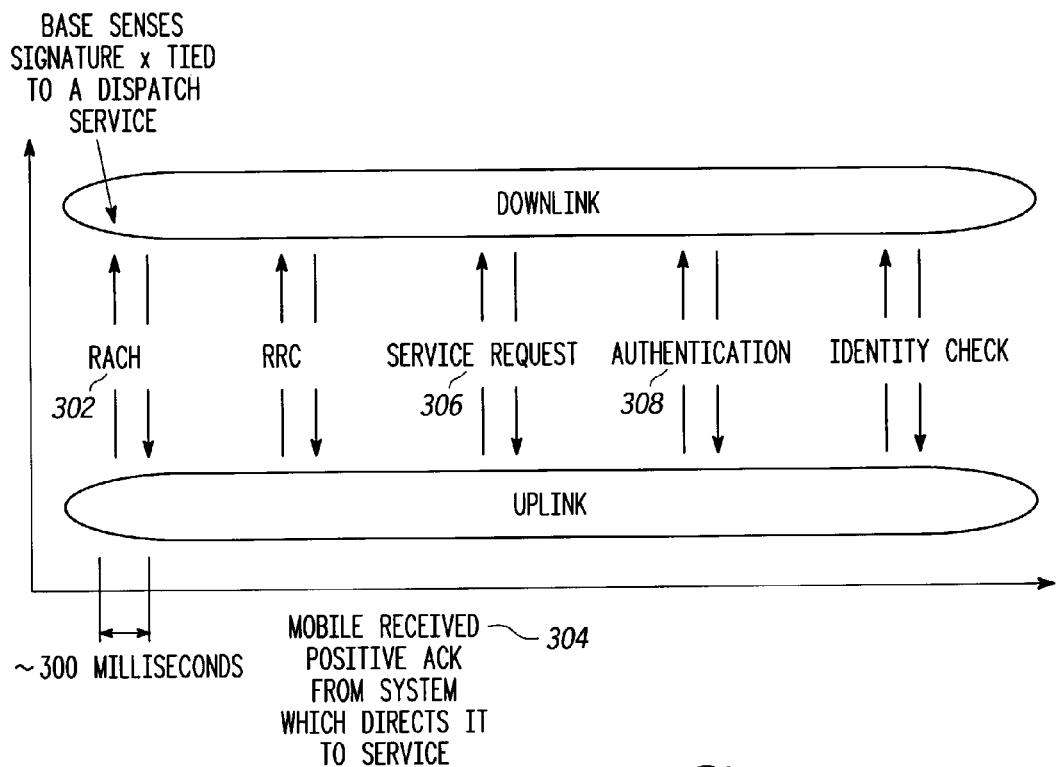
FIG. 3 shows a diagram illustrating the steps taken in a successful attempt for service in accordance with the invention.

Referring now to FIG. 3, there is shown a service negotiation sequence in accordance with the present invention. Instead of going through the lengthy process between the MS and system as shown in FIG. 2, the RACH signatures 302 transmitted in accordance with the invention not only mean a request for a signaling connection, but also that a particular type of service/application (e.g., Dispatch, web browsing, etc.) is being requested. In accordance with the invention, each RACH signature is tied (associated) to a particular service/application that is being requested. For example, the first signature ($S_1$) may be associated at the MS and at the system to mean that the MS wants a dispatch service, the second signature ($S_2$) may mean that a web browsing service is being requested, etc.

A service request will still be needed for particular services, but by tying a particular signature to a particular service type, unnecessary negotiations are reduced. This is true for a real time service like Dispatch, since Dispatch has a fixed QoS requirement that is known to a system. So instead of negotiating the QoS parameters with the system each time, the signature sent in the RACH preamble 302 can be an early check for a particular system resource. If the system has the resources available, it will acknowledge 304 the MS in the same way it did before. The mobile and base (cell site) proceed with their normal service negotiation if necessary, or alternatively, the MS can skip the service negotiation 306 and move directly into the Authentication step 308 further shortening the setup time.

Figure 4:
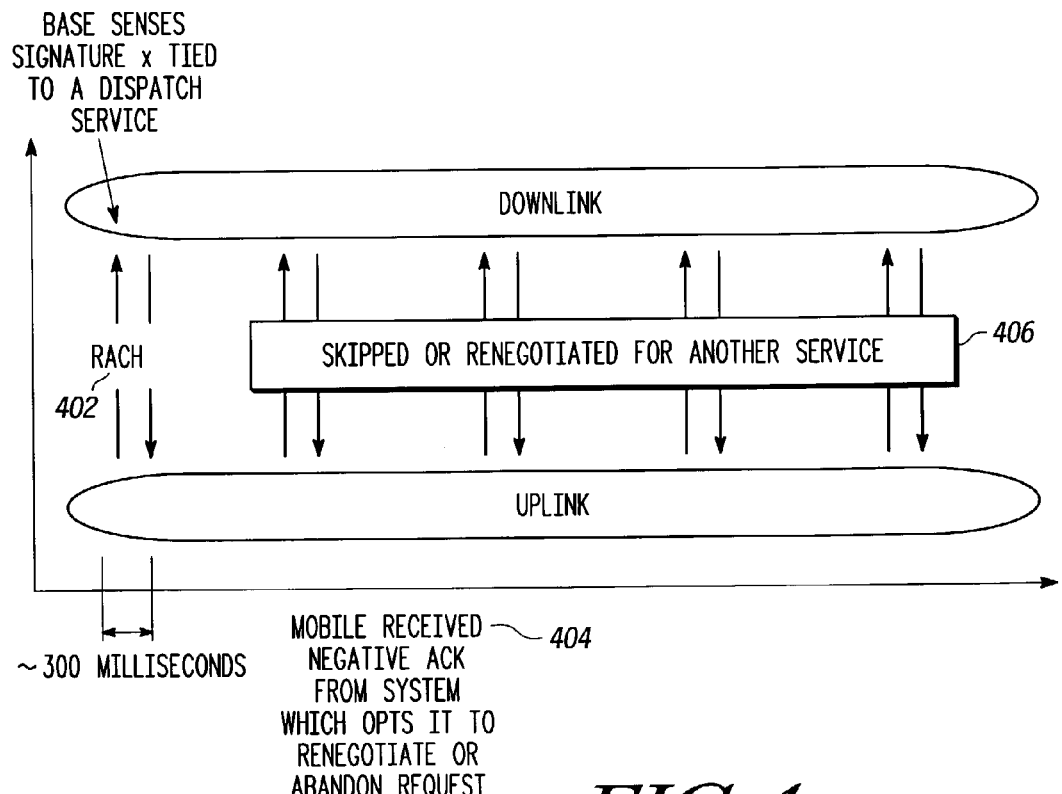
FIG. 4 shows a diagram illustrating the steps taken in an unsuccessful attempt for service in accordance with the invention.

Shown in FIG. 4, is a failed attempt for a service request in accordance with the invention. In step 402, the MS sends a RACH preamble with a signature that is associated in accordance with the invention with for example a Dispatch service. If the system determines it cannot support the requested Dispatch service, the system will send a negative acknowledgment to the MS 404, and the rest of the service negotiation process can be skipped or the MS can renegotiate with the system for another type of service/application 406. Using the present invention cuts back in any wasted time since the MS knows much quicker if the service requested can be supported by the system. It also helps reduce system noise by ending service negotiation requests that cannot be supported by the system. Using the RACH signature to mean not only concept of the invention, the MS realizes that there is no use in sending a service request, since the system has informed it cannot support the request.

Figure 5:
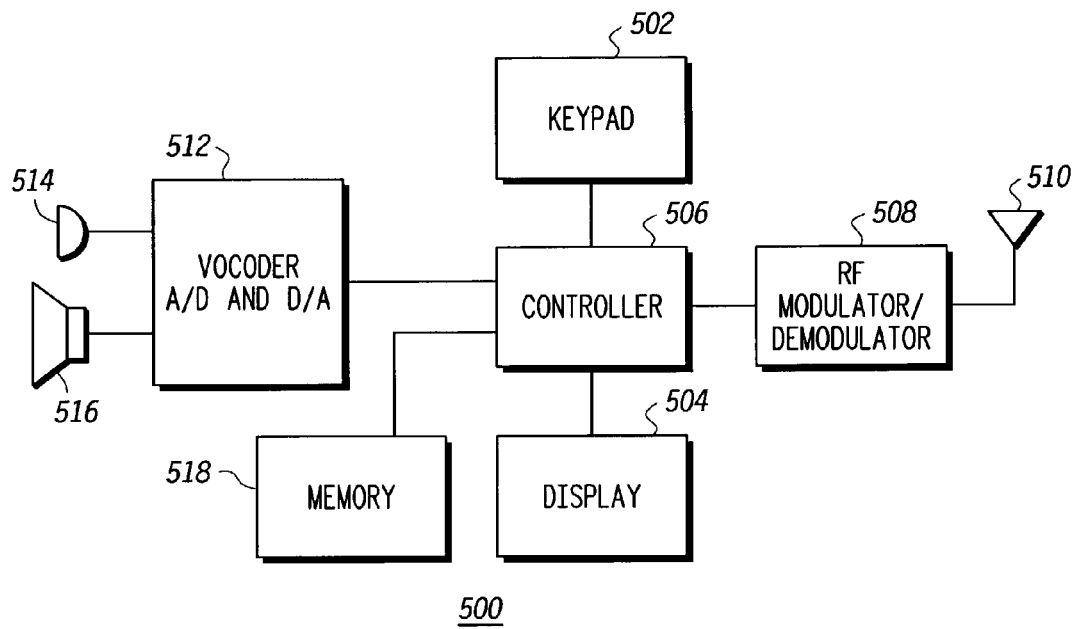
FIG. 5 shows a block diagram of a mobile station in accordance with the invention.

Referring now to FIG. 5, there is shown a simplified block diagram of a wireless communication device such as a UMTS compatible MS 500 in accordance with the invention. MS 500 includes a controller 506 such as a microprocessor and/or digital signal processor that controls the functions and operation of the MS 500. A keypad 502 and display 504 are coupled to the controller 506 and allow for user interface with MS 500. A microphone 514 is provided for converting voice signals from the user into electrical signals, while a speaker 516 provides audio signals to the user. A voice codec (vocoder) and Analog-to-Digital (A/D) and also Digital-to-Analog (D/A) block 512 provides all the necessary digital voice processing for converting analog voice into digital data ready for radio frequency (RF) transmission and vice versa. RF modulator/demodulator block 508 transmits and receives the RF signals via antenna 510.

In accordance with the present invention, the signatures sent by the communication system to the MS are stored in memory 518. In accordance with the invention, each of the stored signatures are associated with a different service/application. Controller 506 selects the appropriate signature from the plurality of signatures stored in memory 518 based on what service/application the user wants to use at the time. For example, if the MS user wants to establish a Dispatch call, the controller 506 would select the signature associated with Dispatch call and use that particular signature during the RACH preamble transmission 302.

Figure 6:
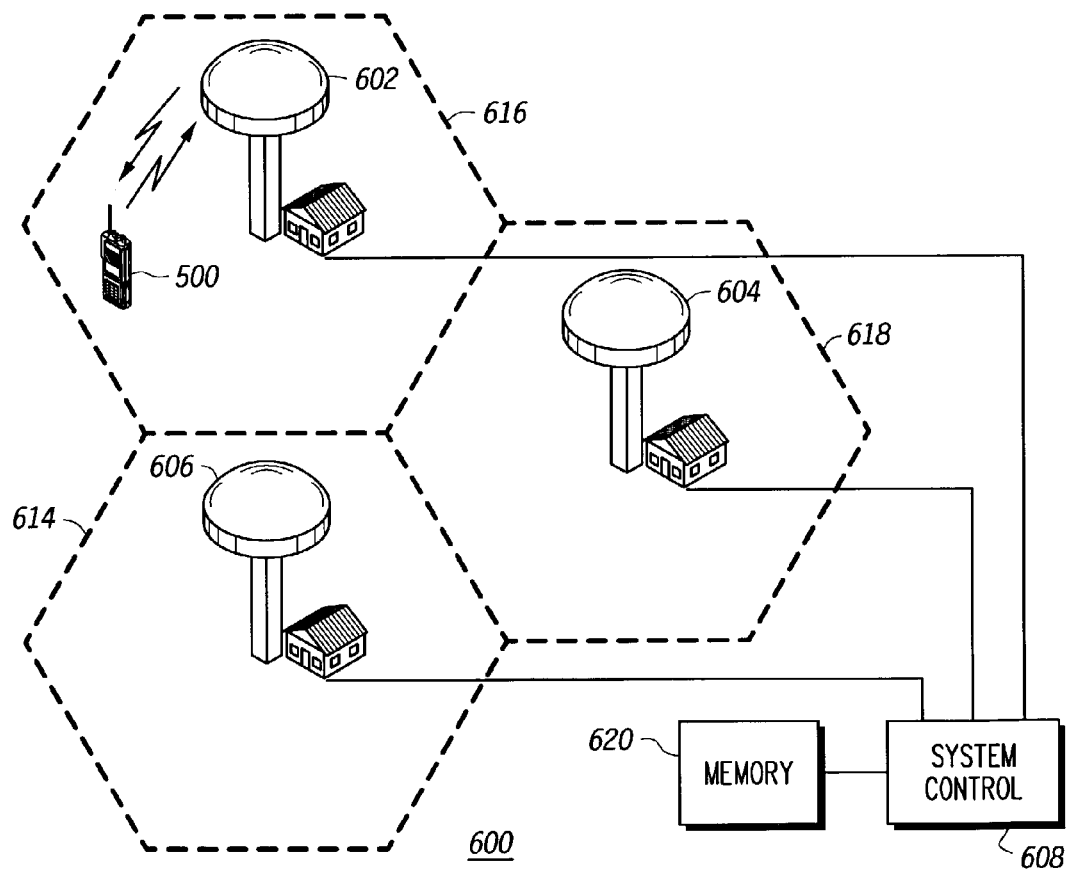
FIG. 6 shows a block diagram of a system in accordance with the invention.

In FIG. 6, there is shown a diagram of a communication system such as a UMTS compatible system 600 that supports the present invention. Communication system 600 includes a plurality of base stations or cell sites 602–606. Each cell site provides the radio frequency link between the land network and the portable communication device or MS 500. Each cell site 602, 604, 606 provides communication coverage over their respective cell coverage areas 616, 618 and 614. A system control 608 provides the necessary coordination between the cell sites 602–606, a landline network (e.g., Public Switched Telephone Network, Internet, etc.) and the MS 500 operating within the wireless communication system 500. In accordance with the preferred embodiment of the invention, when MS 500 registers with the system or the system is initialized, system control 608 causes a set or plurality of signatures (e.g., 16 signatures) stored in memory 620 to be sent to MS 500. MS 500 stores these signatures in memory 518. The signatures sent in accordance with the invention are each associated with a different service/application type. As previously mentioned, a real time voice service like Dispatch, may be assigned the first signature, web browsing may be assigned the second signature, etc. Both the system and MS 500 know what service type is associated with what signature, since they both have stored a table that links a specific signature to a specific service/application for each MS in the system. In FIG. 7 there is shown an illustrative table 700 that shows the linking of a signature, for example signature 1 702 to a specific service/application 704, in this example a Dispatch service. The system will have a similar association of services/applications for each of the MSs operating in the system. The transmission of the information as previously mentioned to the MSs can occur upon system initialization or when an MS registers with the system, although other designs can be implemented without deviating from the scope of the invention.

In any communication system, channel capacity is a concern for system operators and mobile users alike. Increasing the system's availability translates into more subscribers being able to use the system at one time thereby providing for better system utilization. For mobile users, it means more channel access grants and less system busy signals. In a CDMA or WCDMA system, channel capacity is directly related to the spreading factor of the channel, Energy bit of information over Noise spectrum (Eb/No), sectored sites, duty cycles, etc. Typically, a communication system stops granting channels due to its inability to decode more data, or simply due to a bad Eb/No ratio.

Reducing the No is a function of better management of the users bandwidth and the present invention helps reduce the No by reducing any unnecessary transmissions during service negotiations.

Another big savings provided by the present invention is the conservation of energy for the MSs since the MSs can much quicker know if the communication system can support their service request. If an MS finds out that the system can not support the requested service it can stop the service request. The concept of combining a RACH signature with a specific service request (e.g., Dispatch, web browsing, etc.) as done in the present invention provides for faster access times, reduced battery life for the MSs and better system traffic control and overall noise reduction since service request negotiations between the system and MS can be made shorter.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for accelerating a service request negotiation between a communication device and a communication system the communication device is operating in, comprising the steps of:

(a) selecting a signature from a plurality of signatures stored in the communication device, each of the plurality of signatures is associated with a specific service/application;

(b) transmitting an access request from the communication device to the communication system that includes the selected signature; and (c) ceasing the service request negotiation in response to the receipt of a negative acknowledgment from the communication system.

2. A method as defined in claim 1, wherein the plurality of signatures stored in the communication device are transmitted to the communication device by the communication system.

3. A method as defined in claim 1, wherein the communication system comprises a Wideband Code Division Multiple Access (WCDMA) system and the access request comprises a RACH preamble.

4. A method as defined in claim 1, wherein in step (a) the communication device selects the signature associated with a service/application that the communication device is requesting access from the communication system.

5. A method as defined in claim 2, wherein the plurality of signatures stored in the communication device are transmitted to the communication device by the communication system when the communication device registers with the system.

6. A method as defined in claim 1, further comprising the step of:

(d) transmitting an acquisition indicator from the communication system to the communication device, if after receiving the access request, the communication system determines it has the resources available to support the service/application associated with the signature received in the access request.

7. A method as defined in claim 1, further comprising the step of:

(d) transmitting the negative acknowledgment from the communication system to the communication device, if after receiving the access request, the communication system determines it does not have the resources available to support the service/application associated with the signature received in the access request.

8. A communication device operable within a communication system, comprising:

a controller;

a memory coupled to the controller; and stored in the memory are a plurality of signatures used during access request transmissions with the communication system, and each signature is associated with a particular service/application type, wherein the controller ceases a service request negotiation between the communication device and the communication system in response to the receipt of a negative acknowledgment from the communication system.

9. A communication device as defined in claim 8, wherein the controller selects a signature from the plurality of signatures that is associated with a service/application the communication device needs access to from the communication system.

10. A communication device as defined in claim 9, further comprising:

a transmitter coupled to the controller; and the controller causes the transmitter to transmit an access request that includes the signature selected by the controller.

11. A communication device as defined in claim 10, further comprising:

a receiver coupled to the controller that receives the negative acknowledgment in response to the access request sent by the communication device.

12. A communication device as defined in claim 10, wherein the communication device comprises a communication device operable in a Wideband Code Division Multiple Access (WCDMA) system.

13. A communication device as defined in claim 12, wherein the access request comprises a Random Access Channel (RACH) preamble.

14. A Wideband Code Division Multiple Access (WCDMA) communication system having a communication device operating therein, wherein a service request negotiation is conducted between the communication system and the communication device, comprising:

a system control; and a memory coupled to the system control, the memory having stared therein a plurality of signatures for use by the communication device during access requests, each of the plurality of signatures is associated with a particular service/application type, wherein the communication device ceases the service request negotiation when the communication device receives a negative acknowledgment from the communication system.

15. A WCDMA communication system as defined in claim 14, further comprising:

at least one base station coupled to the system control; and the system control causes the plurality of signatures stored in the memory to be transmitted from the at least one base station to the communication device.

16. A WCDMA communication system as defined in claim 15, wherein the system control causes the plurality of signatures to be transmitted to the communication device when the communication device registers with the WCDMA communication system.

17. A WCDMA communication system as defined in claim 15, wherein the service/application type that the plurality of signatures are associated with are also transmitted to the communication device.

18. A WCDMA communication system as defined in claim 15, wherein the communication device transmits an access request using one of the plurality of signatures, and the communication system upon receiving the access request determines if it has the resources to support the service/application associated with the signature found in the access request.

19. A WCDMA communication system as defined in claim 18, wherein the WCDMA communication system sends the negative acknowledgment to the communication device if it determines it does not have the resources to support the service/application the communication device is requesting.

* * * * *